United States Patent
Sindambiwe

(10) Patent No.: US 8,090,818 B2
(45) Date of Patent: Jan. 3, 2012

(54) GENERATION OF CUSTOMIZED CLIENT PROXIES

(75) Inventor: Eugene Sindambiwe, Mannheim (DE)

(73) Assignee: SAP AG, Walldorf (DE)

( * ) Notice: Subject to any disclaimer, the term of this patent is extended or adjusted under 35 U.S.C. 154(b) by 1260 days.

(21) Appl. No.: 11/231,032

(22) Filed: Sep. 19, 2005

(65) Prior Publication Data

US 2007/0067437 A1 Mar. 22, 2007

(51) Int. Cl.
*G06F 15/16* (2006.01)
(52) U.S. Cl. .................. 709/224; 709/205
(58) Field of Classification Search .......... 709/203–224, 709/228–242; 705/1, 237; 719/316; 358/1.15; 370/230; 380/28
See application file for complete search history.

(56) References Cited

U.S. PATENT DOCUMENTS

| | | | | | |
|---|---|---|---|---|---|
| 6,144,991 | A * | 11/2000 | England | | 709/205 |
| 6,360,249 | B1 * | 3/2002 | Courts et al. | | 709/203 |
| 6,385,661 | B1 * | 5/2002 | Guthrie et al. | | 719/316 |
| 6,625,604 | B2 * | 9/2003 | Muntz et al. | | 707/9 |
| 6,687,831 | B1 * | 2/2004 | Albaugh et al. | | 726/7 |
| 6,895,425 | B1 * | 5/2005 | Kadyk et al. | | 709/203 |
| 7,016,866 | B1 * | 3/2006 | Chin et al. | | 705/26 |
| 7,076,534 | B1 * | 7/2006 | Cleron et al. | | 709/219 |
| 7,290,029 | B2 * | 10/2007 | Tang et al. | | 709/203 |
| 7,380,202 | B1 * | 5/2008 | Lindhorst et al. | | 715/204 |
| 7,657,609 | B2 * | 2/2010 | Klevenz et al. | | 709/218 |
| 2002/0083132 | A1 * | 6/2002 | Holland et al. | | 709/203 |
| 2002/0103856 | A1 * | 8/2002 | Hewett et al. | | 709/203 |
| 2003/0009476 | A1 * | 1/2003 | Fomenko et al. | | 707/103 R |
| 2003/0093520 | A1 * | 5/2003 | Beesley | | 709/224 |
| 2003/0093551 | A1 * | 5/2003 | Taylor et al. | | 709/237 |
| 2004/0093228 | A1 * | 5/2004 | Carson et al. | | 705/1 |
| 2004/0148183 | A1 * | 7/2004 | Sadiq | | 705/1 |
| 2004/0215717 | A1 * | 10/2004 | Seifert et al. | | 709/203 |
| 2005/0097095 | A1 * | 5/2005 | Halt, Jr. | | 707/3 |
| 2005/0097180 | A1 * | 5/2005 | Abdelhak | | 709/208 |
| 2005/0198322 | A1 * | 9/2005 | Takabayashi et al. | | 709/228 |
| 2005/0204047 | A1 * | 9/2005 | Mitchell et al. | | 709/228 |
| 2005/0268309 | A1 * | 12/2005 | Krishnaswamy et al. | | 719/330 |
| 2006/0095413 | A1 * | 5/2006 | Moffat et al. | | 707/3 |
| 2006/0164676 | A1 * | 7/2006 | Walker et al. | | 358/1.15 |
| 2006/0173951 | A1 * | 8/2006 | Arteaga et al. | | 709/203 |
| 2006/0182028 | A1 * | 8/2006 | Chan et al. | | 370/230 |
| 2007/0011274 | A1 * | 1/2007 | Klevenz et al. | | 709/218 |
| 2007/0043837 | A1 * | 2/2007 | Kruse et al. | | 709/220 |
| 2007/0044133 | A1 * | 2/2007 | Hodecker | | 725/117 |
| 2007/0055755 | A1 * | 3/2007 | Sasnett et al. | | 709/223 |
| 2007/0129953 | A1 * | 6/2007 | Cunningham et al. | | 705/1 |
| 2007/0162461 | A1 * | 7/2007 | Mankoff | | 707/10 |
| 2007/0180386 | A1 * | 8/2007 | Ballard et al. | | 715/744 |
| 2007/0189514 | A1 * | 8/2007 | Mehta et al. | | 380/28 |
| 2007/0199002 | A1 * | 8/2007 | Marvin et al. | | 719/330 |
| 2008/0201476 | A1 * | 8/2008 | Ramaswamy et al. | | 709/226 |
| 2008/0263225 | A1 * | 10/2008 | Nadalin et al. | | 709/242 |
| 2009/0083269 | A1 * | 3/2009 | Artz et al. | | 707/6 |
| 2009/0172091 | A1 * | 7/2009 | Hamel | | 709/203 |

* cited by examiner

*Primary Examiner* — Bunjob Jaroenchonwanit
(74) *Attorney, Agent, or Firm* — Fish & Richardson P.C.

(57) ABSTRACT

Methods and apparatus, including computer program products, for generation of customized client proxies. A method of generating client proxies includes receiving properties of a client, determining customizations for a client proxy based on the properties of the client, and generating the client proxy, where the client proxy includes the one or more customizations. Generating the client proxy can include generating the client proxy as executable code to execute on the client, source code to be compiled on the client, or a combination of source code and executable code. A customization can define a modification of a default client proxy, a combination of designtime objects for a client proxy, a combination of runtime objects for a client proxy, or a combination of all three techniques or different techniques.

20 Claims, 3 Drawing Sheets

GENERATION OF CUSTOMIZED CLIENT PROXIES

BACKGROUND

The present invention relates to data processing by digital computer in a service oriented architecture, and more particularly to generation of customized client proxies.

In a client/server computer system, a server typically hosts a service that is accessed by a client. Communications between a client and a server generally require that the technologies of each are compatible with one another such that the client can understand communications from the server, and vice versa. For example, over the Internet, a web browser may use the Secure Sockets Layer (SSL) protocol to communicate with a web application server. To communicate using SSL, both the client and server on which the web browser and web application server, respectively, run should support SSL.

One technique for assisting communications between a client and a server involves the use of a server proxy (not to be confused with a proxy server), which can act as an intermediary between a client and a server by modifying communications received from or sent to a client such that the communications can be understood by a server or client, respectively. As examples, a server proxy can assist communications by receiving and modifying messages received from a client such that the messages are understood by a server, or by formatting and sending messages to a client such that the messages are understood by the client.

Similar, in some aspects, to a server proxy is a client proxy. In one aspect, a client proxy is similar, as a client proxy can assist communications between a client and a server by working as an intermediary between the two. In some aspects the client proxy differs. For example, a client proxy is typically a client-side proxy, as opposed to being server-side. A client proxy can act as an intermediary between a client and a server by modifying communications received from or sent to a server such that the communications can be understood by a client or server, respectively. As an example, a client proxy can format remote procedure calls and send them to a server using a protocol that is compatible with the server. As a result of the client-side nature of a client proxy, applications on the server appear from a client's perspective as if they reside on the client-side of a client/server computer system. By its nature a client proxy is hosted at the client-side, whereas the server proxy is hosted at the server side. Furthermore, a client proxy may be specific to a fixed client platform in terms of hardware, database, operating system or programming language and may bound to a well-defined runtime environment (e.g., application embedment, graphical interface, and the like). In contract, a server proxy is intended to service a broad, possibly heterogeneous client landscape: It enables the management of client platform heterogeneity, which can include management of hardware, databases, operating systems, or programming languages, through conversion processes that are server-side hosted and interposed between the client and the server.

SUMMARY OF THE INVENTION

The present invention provides methods and apparatus, including computer program products, that implement techniques for generating customized client proxies.

In one general aspect, the techniques feature a method of generating client proxies. That method includes receiving one or more properties of a client, determining one or more customizations for a client proxy based on the one or more properties of the client, and generating the client proxy, where the client proxy embodies the one or more customizations.

The invention can be implemented to include one or more of the following advantageous features. Generating the client proxy can include generating the client proxy as executable code to execute on the client, source code to be compiled on the client, or a combination of source code and executable code. The client proxy can be configured to be a stand-alone application or to operate, for example, in a web browser.

A customization can define a modification of a default client proxy, a combination of designtime objects for a client proxy, a combination of runtime objects for a client proxy, or a combination of these. A customization can be prescribed in a format in accordance with a service description and generating the client proxy can include generating the client proxy in accordance with the service description. The service description can be expressed in Web Services Description Language (WSDL), or a similar language. A modification can define a setting of a value for a default client proxy.

The properties of the client can include one or more security protocols supported by the client or properties of an operating system running on the client.

The method can further include transferring the generated client proxy to the client. The one or more customizations can be at least one or more of a modification of a default client proxy, a combination of designtime objects for the client proxy, a combination of runtime objects for the client proxy, or a combination of a default client proxy, designtime objects, and runtime objects. The one or more customizations can tailor the client proxy to an individual client, a user of a client, or both. The client proxy can be configured to reside on the client and act as an intermediary between the client and a server by modifying communications received from and sent to the client such that the communications are understood by the server and the client, respectively. The client can be defined by software, hardware, or a combination of hardware and software that is configured to access a service running on the server, where the client being defined by software or a combination of hardware and software includes at least one or more of a standalone application or a web browser, and the client being defined by hardware or a combination of hardware and software includes a computer.

Other aspects of the invention can include, a computer program product, tangibly embodied in an information carrier, that is operable to cause a data processing apparatus to perform operations similar to those of the method described above, and a client proxy generation infrastructure system configured to perform operations similar to those of the method described above.

The invention can be implemented to realize one or more of the following advantages. Customized client proxies can be generated automatically based on designtime objects, runtime objects, or both. User convenience of generating client proxies can be improved, as the generation of customized client proxies need not require specialized knowledge of underlying technologies. For example, a software vendor can provide a client proxy generation infrastructure and resources that include an implementation of a complex security protocol. In that example, a customer of the vendor need not know the details of the security protocol to generate a customized client proxy that supports the security protocol.

As the generation of client proxies can be automatic, some implementations of the invention can require few, if any, customizing activities to be performed by a user. For example, technical and application-level customizing parameters can be populated automatically during generation of user- or usage-specific client proxies, thereby pre-configuring and customizing client proxies. Thus, client proxies can be "plug and play," and can run as a standalone application or as a part of another application (e.g., use a web browser for a runtime environment).

Because details of underlying technologies need not be known to generate a customized client proxy, adoption of the technologies can reach a broader audience as less-technically inclined users can generate customized client proxies conveniently.

Little or no negotiation capabilities may be required by a server and a client for agreeing on a collaboration profile or policy because a hosting entity can define the collaboration profiles or policy for a client. For example, "rich" client proxies can include customizations that handle protocols and by virtue of a server running a service providing the client proxies, a client can conform to the protocols. Likewise, collaboration agreements and policies can be easily enforced due to the client-side nature of client proxies. For example, security protocols and policies can be included in the client proxy such that the security protocols are available and are enforced according to the policies.

Deploying client proxies that are generated by a customized client proxy generation infrastructure can be less time-consuming than other techniques for deploying client proxies. For example, a company headquarters with limited resources for customizing software solutions can generate client proxies for interaction with branch offices quickly as they need not rely on a time-consuming process of customizing client proxies for each branch office. Similarly, automatic generation of customized client proxies can decrease the time needed to deploy customized client proxies across a diverse landscape of client environments, as a variety of implementations of resources for use in different environments can be provided with the client proxy generation infrastructure such that customized client proxies for the client environments can be generated quickly.

The use of a client proxy generation infrastructure can ease the deployment and adoption of patches to client proxies. For example, a client proxy generation infrastructure can store information about the client proxies that have been generated and can use that stored information to generate customized updates that should be made to some or all client proxies. In addition, because client proxies are generated by an infrastructure and the infrastructure can have some degree of control over client proxies (e.g., through a policy that automatically applies updates), the client proxy infrastructure can control the process of modifying (e.g., updating) client proxies to ensure patches are applied.

Because of the client-side nature of the client proxies, server performance can be optimized by implementing client proxies that can run in offline mode to some degree (e.g., during data entry), there can be fewer client/server interactions and less time online.

Details for customizing client proxies can be retained in an infrastructure for generating client proxies. Advantageously, this can reduce the accessibility of client proxies and corresponding security protocols to the public such that client proxies can be more secure.

Client proxies can be customized such they uniquely identify (e.g., across time and electronic space) a physical entity (e.g., client hardware), a legal entity (e.g., a person or a company that has a client), a time-stamped communication session, an individual connection and the like. By uniquely identifying the source of a communication through different aspects, the source of a security threat can be easier to trace. For example, each client proxy can have personal information of an entity (e.g., a individual user or a company) associated with the client proxy such that a log of events by client proxies can be traced to an individual or a company.

Isolation of access credential or personal information can be increased by retaining credentials and personal information at a client proxy, thereby increasing the security of a client/server system.

Because information can be retained on at a client proxy, redundant entry of information can be reduced. The processes of retaining information, causing to exchange retained information, or exchanging retained information between the client proxy and the server might not be observable to the end user, thereby simplifying an end-user's experience. For example, a bank account number can be stored at a client proxy and a web banking service which requires the bank account number for accessing the service can be accessed without requiring the user to repeatedly enter the bank account information. Also, encrypted versions of information might be exchanged with or saved together with the client proxy to reduce security threats as the client proxy might not be enabled to access or decode the retained information. Also, because entry can be retained at a client proxy, client proxies can operate in a batch mode, without user interaction, which can advantageously increase productivity.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Overview of a Client/Server System

Figure 1:
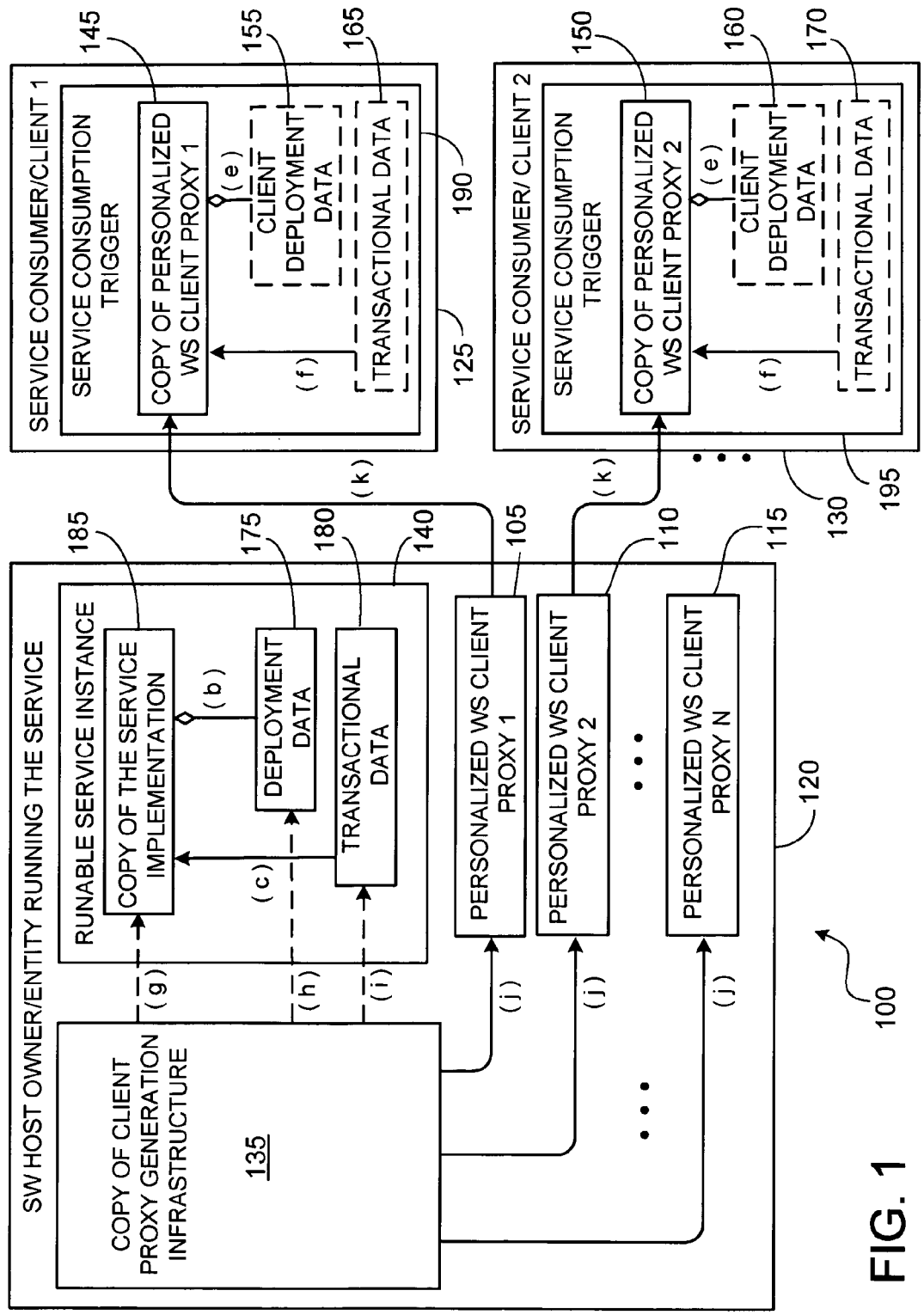
FIG. 1 is a diagram of an example client/server computer system that includes customized client proxies.

FIG. 1 is a diagram of an example client/server system 100 that includes customized client proxies 105, 110, 115. For the description of FIG. 1, the term server refers to a combination of software and hardware that can host services that are accessible to a client. Similarly, in reference to FIG. 1, the term client refers to a combination of hardware and software that can be used to access a service running on a server. Although the terms server and client with reference to FIG. 1 are used to refer to the combination of hardware and software, either of the terms can be used to refer to the hardware or software, but not a, combination of the two. For example, the term server could be used to refer to hardware on which a service runs or software on which a service runs. Services in FIG. 1 implement a web service that includes a collection of protocols and standards for exchanging data between applications or systems; however, other types of services may be implemented. For example, a service can be a functional module defined by a fiction-oriented programming language, a procedure defined by a procedural programming language, a class in an object-oriented programming language, or any other type of modularized entity conforming to a fixed programming paradigm. The collection of protocols and standards implemented using a web service can include, but are not limited to, Web Services Protocol Stack; eXtensible Markup Language (XML); messaging protocols, such as SOAP; service transport protocols, such as HyperText Transfer Protocol (HTTP); service description languages, such as Web Services Description Language (WSDL); a service discovery protocol, such as Universal Description, Discovery, and Integration (UDDI); and, security protocols, such as Web Services Security (WS-Security).

The client/server system 100 includes a server 120 and clients 125, 130. In that system, a copy of a client proxy generation infrastructure 135, a runnable service instance 140, and the customized client proxies 105, 110, 115 reside on the server 120.

A runnable service instance, such as the runnable service instance 140, can be executable code (e.g., a Java program compiled into bytecode) that can receive, directly or indirectly (e.g., through a proxy), communications from a client that trigger the service to execute in a runtime environment. As an example, a runnable service can be an application that starts in response to a trigger such as a service call (also referred to as a service consumption trigger).

The clients 125, 130 of FIG. 1 can be referred to as "service clients" because they can interact with the server 120 to trigger execution of the runnable service 140. For example, the first client 125 can generate a service call that triggers execution of the runnable service 140 (generating a service call can also be referred to as "requesting service").

To maintain a client/server relationship, the clients 125, 130 should operate separately from the server 120. For example, the clients 125, 130 can reside on a computer system that is different from the computer system on which the server 120 resides. Typically a client is connected to a server by a network, such as a Local Area Network (LAN) or Wide Area Network (WAN) (e.g., the Internet). Clients and servers need not have similar implementations of hardware and software and can have various types of heterogeneity. As examples, the first client 125 and the server 120 could have different runtime environments, have originated from source code in different programming languages, have different types of database management systems, have different operating systems, and/or have different hardware.

The clients 125, 130 can communicate (e.g., interact) with the server 120 through client proxies 145, 150. As discussed earlier, a client proxy acts as an intermediary (e.g., a liaison) between a client and a server. To act as an intermediary, a client proxy can modify, generate, or modify and generate, communications between a client and a server. Through modifications and/or generations of communications, a client proxy can alleviate challenges posed by some or all of the heterogeneities between a client and a server. Consequently, from a client's perspective, a service can appear to be functioning on the client machine without the use of a server.

For example, the first client 125 can access a database on the server 120 by accessing the runnable service instance 140. To access that database, the client 125 can run a first client proxy 145 that translates database requests from the types of database requests used by the client 125 to a type of format for database requests used by the server 120. Because the first client proxy 145 can automatically translate the requests, the runnable service 140 can appear to be running on the first client 125, as interactions with the runnable service 140 by the first client 125 (through the first client proxy 145) do not require modification by the first client 125 (as they can be handled by the first client proxy 145).

The environment (e.g., runtime and/or designtime environment) of the clients 125, 130 differ from each other. As examples, the platforms of the clients 125, 130 can differ by having different operating systems, versions of operating systems, types of database management software, hardware, and the like. To account for differences such that client proxies 145, 150 can properly execute on the clients 125, 130, a client proxy can be customized such that it can be used on one or more clients. In some cases, such as is the case in FIG. 1, the customization of a client proxy can include personalization, which can involve tailoring a client proxy to an individual client. For example, a personalized client proxy can include a bank account number associated with an end-user. In FIG. 1, the client proxies 145, 150 on the clients 125, 130 are personalized with different data, thus, the client proxies 145, 150 are different from each other.

Client Proxy Generation Infrastructure

Customizing a client proxy is performed automatically by the client proxy generation infrastructure 135. The customization is generally done before a client proxy is distributed to a client, although in some implementations it can vary. For example, client proxies may be deployed and customized at a client by a patch that applies customizations.

The client proxy generation infrastructure 135 generates a customized client proxy based on data that is received from a client, including one or more properties of a client. The client proxy generation infrastructure 135 can perform different types of customizations, including, customizing a default client proxy for the platform on which a generated client proxy can run and personalizing a default client proxy for the client. In some implementations, the client proxy generation infrastructure 135 can generate a customized client proxy without relying on default client proxies. For example, by using a combination of design objects, implementation objects of a service, or both, together with a set of client properties (e.g., properties not accessible to a software vendor at the time of distributing a client proxy generation infrastructure to a service host, where the properties are received from a client). In some implementations, such a client proxy generation infrastructure might use a service description in a formal language similar to or the same as Web Services Description Language (WSDL), where that language can be provided by a software vendor, and can be enhanced and modified by a service host. In those implementations, generating a client proxy can involve generating the client proxy in accordance with the service description.

Client properties that are used by the client proxy generation infrastructure 135 can exist as master data or business transaction data to an application, and can be accessible upon a trigger from the service generation infrastructure) or be provided in any kind of interaction including one with the person or company for whom or for which the client proxy is generated. In general, master data corresponds to one or more properties of a fixed client (e.g., names, postal address, bank account, and the like), which are independent of a business transaction. Master data tends to be a prerequisite of a business transactions involving a given client. Master data tends to be created once for each client and are therefore shared between several client proxies used by the same business partner (a person or company) whenever applicable. By its nature, master data tend to not change as often as transaction data.

The client proxy generation infrastructure 135 can customize a default client proxy for a client platform on which a generated client proxy can run by choosing a default client proxy from a pool of default client proxies (e.g., choosing a Microsoft Windows compatible client proxy or choosing a UNIX compatible client proxy), by setting values that make a default client proxy compatible with the client platform (e.g., choosing values for network properties), or a combination of the two. A client proxy is personalized by the client proxy generation infrastructure by setting values of a default client proxy based on properties of a client (e.g., user credentials associated with a client in a client proxy).

As an example, if the first client 125 identifies itself as a Microsoft Windows 2000 client for a user with specific credentials (e.g., a user name and password associated with a bank account), the client proxy generation infrastructure 135 can generate a customized client proxy by selecting a Microsoft Windows-compatible default client proxy (e.g., compatible across different versions of Microsoft Windows), set values of the default client proxy that are specific to the Microsoft Windows 2000 platform, and personalize the client proxy by setting a bank account value based on the client's credentials.

The types of values that can be set to customize a client proxy generated by the client proxy generation infrastructure 135 can include, values identifying a service server (e.g., a network location of a service server), service parameters (e.g., such that an end-user of a client proxy need not enter service parameters), technical client-side deployment settings (e.g., settings that are provided and prescribed for a client depending on a client platform), and values related to security tokens (e.g., a validity interval stamp, watermarks, digital signature, and the like). In some implementations, different, fewer, or additional types of values can be set. The values can be set such that the customizations of a client proxy need not be known to an end-user and might not be modifiable by an end-user. For example, a default value may be changed such that it is read-only, encrypted but visible, or hidden from an end-user.

In some implementations, different techniques can be used to generate customized client proxies, and different, fewer, or additional types of customizations can be performed to generate a customized client proxy. For example, instead of, or in addition to, using default client proxies to generate a client proxy, other types of resources can be used to generate a client proxy. Following that example, a client proxy generation infrastructure can generate a client proxy by selecting a combination of modules (such as designtime objects, runtime objects, or a combination of both) that are designed to interface with each other. In an example implementation, the resources can include several general modules, where each corresponds to a different operating system (e.g., Microsoft Window-compatible, UNIX, Apple Macintosh, and the like), modules based on functionality that should be customized on a client proxy (e.g., a WS-Security module for adding a security protocol, a SOAP module for messaging, and the like), and modules for personalization (e.g., a module that includes deployment data associated with a client).

With reference to FIG. 1, client proxies that are generated by the client proxy generation infrastructure 135 are generated as executable code such that they can be deployed and run in a client environment (e.g., byte code that is specific to a runtime environment of a target client). Implementations can vary. For example, a client proxy generation infrastructure can generate client proxies that are composed of source code (e.g., in a programming language like Advanced Business Application Programming (ABAP), Java or C++ source code). Following that example, the source code can be deployed to a client and a runnable version of the client proxy can be generated by a compiler on the client. The compiler can reside on the client or a client proxy can be generated as a self-installing file that includes a compiler and source code for automatically generating an executable version of a customized client proxy on a client machine. This can be advantageous as, if customized client proxies are generated by a combination of source code components (e.g., a combination of object-oriented programming language classes), the resource burden of compiling code can be shifted from a client proxy generation infrastructure to a client. Compilation of a client proxy on a client can be necessitated by the nature of the client/server environment, such that it would be advantageous to generate a client proxy as source code. For example, compile-time resources (such as environment variables) that are specific to a client might be available to a client, but not available to a client proxy generation infrastructure, in which case, a customized client proxy that is generated as source code might need to be performed on a client. As another potential advantage, client proxies can be further customized by a specialist if a client proxy is generated as source code.

As described above, the client proxy generation infrastructure 135 uses resources, such as default client proxies, a service description, and properties of a client as input for generating a client proxy. Implementations of a client proxy generation infrastructure can use different, additional, or fewer types of input for generating a client proxy. For example, other types of resources can be used. Other types of resources can include, data provided by a software vendor that assists with generation of a client proxy (e.g., a table of values that should be set for a default client proxy based on a type of client platform), transaction data for a client proxy (e.g., a database to be deployed with a client proxy and used as content for a service), deployment data for a client proxy (e.g., a protocol or policy to be used by a client proxy, including, a master deployment or shared deployment parameter, or deployment data that is individualized for a service), metadata of a service for which a client proxy should be generated (e.g., data that assists in accessing a service in a service repository), a deployment meta model of a service (e.g., a domain of allowed values for deployment parameters), technical data related to a target client (e.g., an identifier used to differentiate the target client from other clients using a service), or personal data of a target client (e.g., an address or bank account number associated with the target client).

The client proxy generation infrastructure 135 is extensible such that additional, differing, or fewer features can be provided to customized client proxies. For example, the client proxy generation infrastructure 135 can contain extension points at which code that was not provided by a software vendor can be executed to add security features (e.g., a new or alternative type of encryption) in client proxies.

Deployment

Once generated, a client proxy can be shipped (e.g., electronically sent or physically provisioned) to a client using different techniques, such sending by electronic mail, enabling download to a user through a web page (e.g., using HTTP or file download) embedding in a physical storage media that is shipped to a user through postal mail, and the like. For example, client proxies 105, 110 can be generated on the server 120 that includes the client proxy generation infrastructure 135, and uploaded using HTTP to the clients 125, 130. The client proxies 145, 150 that reside on the clients 125, 130 can be referred to as copies of the client proxies 105, 110 on the server 120. The client proxies 145, 150 that reside on the clients 125, 130 can differ from the client proxies 105, 110 that reside on the server 120. For example, the client proxies 145, 150 that reside on the clients 125, 130 can be compiled versions of the client proxies 105, 110 that reside on the server 120.

The Service Oriented Architecture

The server 120 and the clients 125, 130 of FIG. 1 are in accordance with the service oriented architecture, where a service on the sever 120 can be accessed by the clients 125, 130. In the client/server computer system 100, the clients 125, 130 use client proxies 145, 150 to access a runnable, service instance 140 that runs on the server 120. A service "instance" refers to the service being a copy of some master code that is running on the server 120. The service instance 140 can vary from other service instances that are based on the same master code, for example, by having customizations (e.g., customizations for deployment) or customer extensions. The term "service" reflects the client-server paradigm in which entities play the role of server and client.

The server 120 implements a service, for example, using web services technologies; however, other technologies can be implemented. Furthermore, the service can be implemented as one or more functions of an application programmed in accordance with a function-oriented programming language, as procedures of an application programmed in accordance with a procedural programming language, as classes of an application programmed in accordance with an object-oriented language, or as any modularized entity programmed in accordance with a fixed programming paradigm.

The service instance 140 is a "runnable" service instance because it is in a state in which its runtime environment can start in response to an external trigger event (also referred to as service call or service consumption). In some implementations of a service instance, a service instance can be referred to as being runnable if it has all required and optional deployment parameters assigned a valid value. Triggers 190, 195 on the clients 125, 130 can be applications that generate a trigger event from which a client proxy causes the runnable service 140 to execute. The triggers 190, 195 can be acted on by an application or a user (e.g., by a user causing execution of a client proxy).

The clients 125, 130 are "service" clients as they can interact (through client proxies 145, 150) with the host environment of the runnable service instance 140 (which resides on a service server 120) to trigger execution of the runnable service instance 140. In general, when a service client and server share a runtime environment (e.g., through a proxy), requesting a service involves calling an executable modularization element, such as a program, a function (module), a web service, and the like.

Client Proxy Operation

The client proxies 145, 150 interact with the runnable service instance 140 to provide access of the runnable service instance 140 to the clients 125, 130. A client proxy installed on a client can be implemented as a standalone application or can use resources on a client. For example, the client proxies 145, 150 on the clients 125, 130 use a web browser as a graphical interface (GUI).

The client proxies 145, 150 can interact with deployment data 155, 160 and transaction data 165, 170 on the clients 125, 130. Deployment data 155, 160 can include a prescription of a message format (e.g., SOAP), a communication protocol (e.g., HTTP), and security and policy standards and the like that can be used to provide techniques and mechanisms for the client proxy to interact with the server 120. The deployment data 155, 160 can be made mandatory by automatic generation and configuration of a client proxy. The deployment data 155, 160 remove the burden of manually configuring a client proxy as well as the risk of generating mismatches between client proxy and server settings. The transaction data 165, 170 includes content that describes transactions performed as part of the service provided by the runnable service instance 140. For example, the transaction data 165, 170 can include records of business transactions. The transaction data 165, 170 can be generated by clients 125, 130, the server 120, or a combination of the two. In some implementations, deployment and transaction data need not exist on the client-side. For example, only server-side transaction data might be used and customizations can be integrated in a customized client proxy such that deployment data need not be used.

Similar to the deployment data 155, 160 and transaction data 165, 170 on the clients 125, 130, the runnable service instance 140 includes deployment data 175 and transaction data 180. The deployment data 175 provides resources and settings to customize copy of the service implementation 185 that is part of the runnable service instance 140. The transaction data 180 on the server 120 can be accessed by the runnable service instance 140 during execution, and can be used as data for a response to requests from the client proxies 145, 150. As depicted in FIG. 1, the client proxy generation infrastructure 135 can use the deployment data 175 and transaction data 180 to generate client proxies, such as the client proxies 105, 110 that reside on the server 120 and are deployed on the clients 125, 130 as client proxies 145, 150.

The client proxies 145, 150 can operate online, offline, or a combination of the two. The client proxies 145, 150 can operate offline as transaction data 165, 170 resides on the clients 125, 130. Offline operation can conserve network and server resources. In some implementations, a client proxy can be implemented such that it only can operate online.

The client proxies 145, 150 can be updated with patches provided by the client proxy generation infrastructure 135. Different types of updates can be made, such as changes to mechanisms or settings of a client proxy (e.g., updating protocols) or content (e.g., updating an address in a database or invalidating a bill that was sent as content).

Although FIG. 1 is illustrated to include certain relationships between components of the client/server system, other implementations of a client/server system or a client proxy generation infrastructure can differ. For example, a client proxy generation infrastructure need not be included on a server where a runnable service instance resides. Following that example, the client proxy generation infrastructure 135 can reside on a dedicated system for generating customized client proxies or on a server separate from the server 120 on which the runnable service instance 140 resides.

Generating Client Proxies

Figure 2:
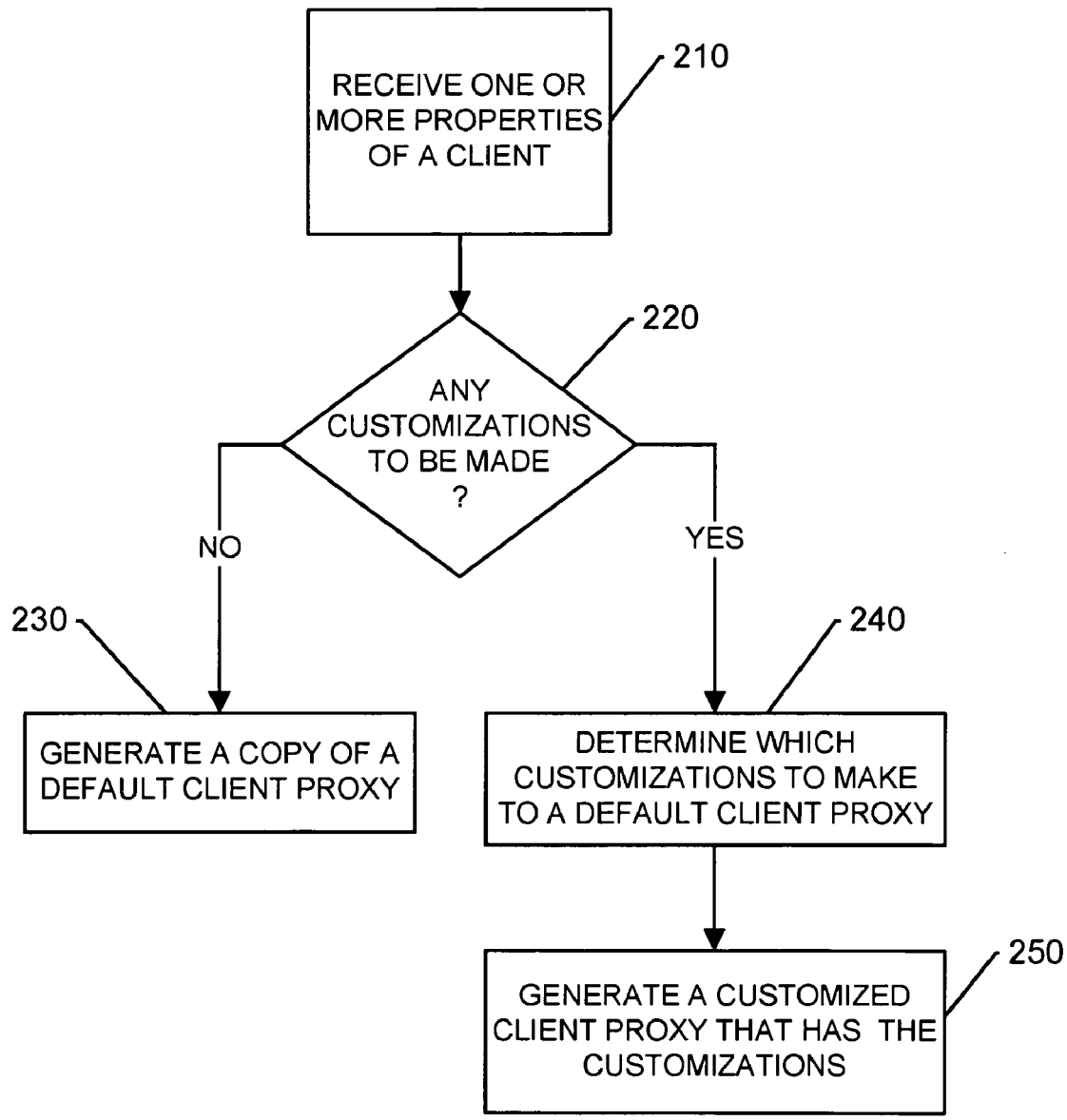
FIG. 2 is a flowchart illustrating an example process of generating customized client proxies.

FIG. 2 is a flowchart illustrating an example process of generating customized client proxies. The process describes how a client proxy generation infrastructure, such as the example client proxy generation infrastructure 135, can generate client proxies. The process involves modifying a default client proxy to generate a customized client proxy, although other techniques can be used to generate a customized client proxy using a process similar to the example process.

At 210, a client proxy generation infrastructure receives one or more properties of a client. The client or server can initiate a communication that results in properties of the client being received by the client proxy generation infrastructure. The properties can include properties of the client platform, the user on the client (e.g., language and log-on name), or a combination of the two. As examples, security protocols supported by the client, the operating system running on the client, the type of web browser running on the client, properties of the user on the client (e.g., user identification and password), preferences of the user on the client, and the like. The properties received by the client proxy generation infrastructure and the properties sent by a client need not be the same type or properties or have the same values. For example, a client can send profile identification information and the profile can be indexed and properties of the client based on the profile can be received by the client proxy generation infrastructure.

Based on the properties received at the client proxy generation infrastructure, a determination is made as to whether any customizations need to be made, at 220. If no customizations need to be made, at 230, a copy of a default client proxy is generated as a customized client proxy. Otherwise, at 240, a determination is made as to which customizations should be made to a default client proxy. Either or both of these determinations (220, 240) can include a comparison of properties of the client with desired properties. For example, a list of properties of the client can be generated based on the properties received at the client proxy generation infrastructure, and that list can be compared to a list of desired properties. The differences, if any, can be used to determine customizations that should be made to a client proxy (e.g., a selection of a default client proxy to use, values that should be set for a default client proxy, or additional components that provide features that should be added to a default client proxyl).

At 250, based on the customizations that should be made, a customized client proxy that has some or all of the customizations is generated. Generating the customized client proxy can include, copying a selected default client proxy (e.g., a default proxy that matches the client platform), adding components that add features to the default client proxy (e.g., a component that adds security protocol support), and setting values of the default client proxy (e.g., setting security settings).

Distribution Environment

Figure 3:
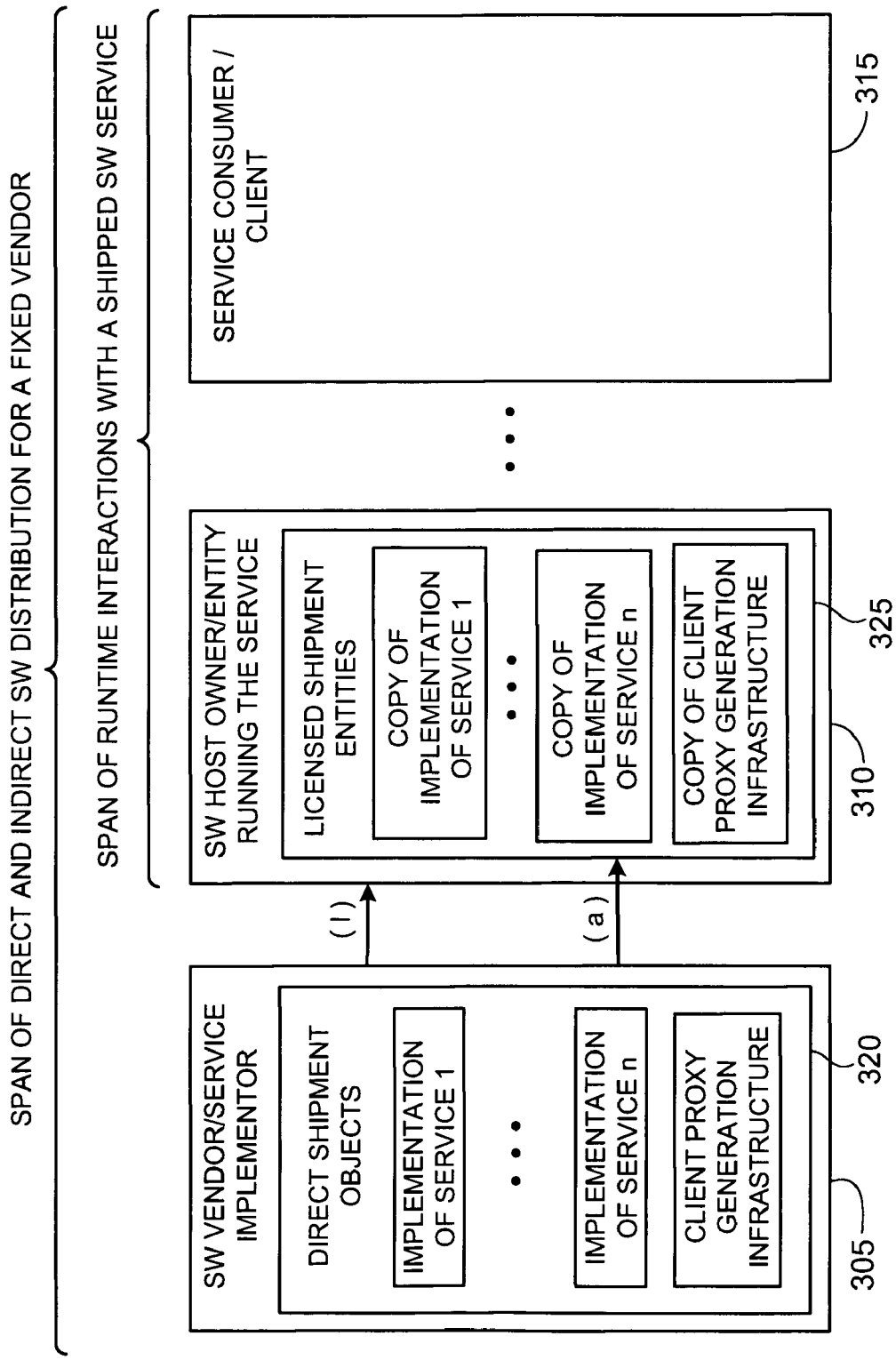
FIG. 3 is a diagram of an example environment for distribution of customized client proxies.

FIG. 3 is a diagram of an example environment for distribution of customized client proxies. FIG. 3 illustrates relationships of a software vendor 305, a software host 310, and a client 315, including the indirect relationship between a software vendor 305 and the client 315, and the direct relationship between the software host 310 and the client 315.

The software vendor 305 has direct shipment objects 320 that are licensed to a software host 310 with which they have contact. The direct shipment objects 320 can be developed by the software vendor 305 or another entity, and include services, such as the services 1 to n, The services that are licensed to the software host 310 can include fewer than all of the services of the software vendor 305.

The software host 310 hosts the licensed services on a server. Clients can access the services through a client proxy. To generate client proxies to be used with the services, the software host 310 has a software copy of a client proxy generation infrastructure, which can be provided to the software host 310 from the software vendor 305. Were the software host 310 not to have a client proxy generation infrastructure, the software vendor 305 might generate many different combinations of values and components to cover the range of customized clients that could be used by a client because of the indirect nature of the relationship between the software vendor 305 and the client 315, and those might be provided, without modifications, from the software host 310 to the client 315. Also, without a client proxy generation infrastructure, the software host 310 would not be able to personalize client proxies easily, or at all. For example, the software host 310 might need to set values of a client proxy manually to generate a personalized client proxy because the indirect relationship of the software vendor 305 and the client 315 inhibits the software vendor 315 from knowing properties of the client 315.

Applications of Customized Client Proxies

Following are several example applications of customized client proxies. The examples include business to business (B2B) and business to consumer (B2C) interactions.

(a) Reading a Utility Meter by a Service Consumer

A utility company can act in the role of a web service host when running a software solution for utilities. In such a scenario, the utility company can operate a server that hosts a dedicated web service and provides rich, personalized client proxies to customers from a client proxy generation infrastructure. The server can personalize client proxies based on the client platform of a customer such that a personalized client proxy includes customer data (e.g., an account identifier, type of account, previous bills, and type of meter device used by the customer) and is customized to assist the client in communicating with the utility company's server (e.g., identifier of the client or a version of the client proxy that is executable on the client). As part of a customer's interaction with the utility company through the client proxy, a customer can read meters manually and enter data into the client proxies without having to manually enter account information or a type of meter device each type the meter is read.

(b) Self Reading by a Utility Meter

Similar to the application of reading a utility meter by a service consumer, is an application that involves a self-reading utility meter. In contrast to the previous application, this application would involve a utility meter or device coupled to the utility meter that provides a utility reading to a client proxy automatically. In such an application, the utility meter reading device could be patchable and remotely controlled based on web protocols through the use of a customized client proxy. Such a device could be easily deployed because the client proxy can be personalized automatically to include account information associated with a utility meter and information about the utility.

(c) Initial Provision of Client Proxies

In one application, a prospective customer can desire to interact with a web services host; however, the host might block non-secure clients from accessing content (e.g., due to confidentiality concerns). To ensure a customer's client system securely communicates with the host, the host can require registration with the prospective customer and use information entered during registration to customize a client proxy according to the prospective customer's client platform. In this application, the client-side nature of a client proxy ensures a client properly communicates with the host, and the customizable nature of a client proxy can ensure that security is tightly integrated into a specific client platform (e.g., by removing security holes in specific client platforms).

(d) Electronic Form Handling

Electronic forms can be handled easily using customized client proxies. Some examples of forms include, bank transfer forms, application forms for membership in professional organizations, application forms for official documents, and tax declaration forms.

As an example, a first business can provide an empty form (that is a default client proxy) to a second business that operates a web service for its customers. The second business can generate customized client proxies based on the empty form and properties of the client. The customizations to the client proxy can include, customization of the form for compatibility with the client platform, adding information related to transport of the form to the server (e.g., a URL for returning a form), adding master data related to the form (e.g., data about collaboration partners), and supplementing the form with transaction data at the server (e.g., a billed amount of a financial transaction).

(e) Client Proxy Yellow Pages

A software solution consisting of a registry of web service client proxies can be implemented, where client proxies from different vendors are registered in a registry. The registry can be publicly accessible and can contain client proxies that are personalized with respect to a host of a web service (e.g., customized for each web service). The registry can include web service hosting entities from different geographical locations, and can be organized in subgroups depending on any taxonomy.

With this set-up, customized digital forms could be deployed from such a directory such that a user experience is similar to that of a yellow pages directory. In that set-up, an end-user need not visit several homepages (e.g., to download bank transfer forms from different companies or application forms for different services) to interact with different digital forms. Instead, a central registry for client proxies can be queried and client proxies can be downloaded. In that case, a client proxy can be customized by a central registry based on a type of digital form. As examples, client proxies can be customized based on a tax authority for which a tax declaration should be sent, or a bank transfer form can be customized to contain information about a receiver of the transfer (bank identifier, bank account number, etc.).

(f) Product/Service Catalogues: Browsing, Ordering and Order Status Tracking

In this application, a "rich" client proxy can be used if there are any access restrictions to a catalogue (e.g., only members of an organization are allowed access) or if catalogue content is personalized for a user (e.g., different users can be offered different products or services). In addition, a customized client proxy can ease ordering of products or services from such a catalogue, or tracking the status of ordered products or services by maintaining customized settings and transaction data.

(g) Ballots and Questionnaires

Client proxies can be used to implement personalized, secure ballots. In this application, eligible voters can receive a certified digital ballot as a customized client proxy from an authority that requires certain security protocols and settings for access. The customized client proxy can include additional security protocols, if necessary for a client, and personalized security settings. To ensure that at most one digital ballot is considered per an end-user, personalization of a client proxy can be hidden from an end-user (e.g., hiding a unique identifier associated with a user and counting one vote from that identifier).

(h) Information Services

Customized client proxies can be used to provide personalized content to authorized consumers of an information service (e.g., a "lookup" service). Examples of information services that can restrict and personalize access through a client proxy can include online newspapers and banking centers. For example, a client proxy for an information service can be personalized to include information about the location of a user to provide local news with consideration of user specific properties, such as language and layout preferences. A customized client proxy can restrict access according to a security protocol preferred by an information service, and, yet, conveniently provide access to the information service (because customized client proxies can automatically provide support for security protocols and the like).

(i) Dispute Management and Refunds

Client proxies can be used to provide refunds for products or services. By storing transaction data and/or being personalized to a user, a client proxy can automatically provide reference data (e.g., customer identifier; transaction specific data, such as a reference number, etc.) for a prior transaction and ease a refund process.

(j) End User Self-Service

Client proxies can be aggregated such that they can be offered as a customized suite of service applications. For example, client proxies can be offered, to a user with limited technical expertise, to be used like a home business-productivity suite (e.g., a combination of spreadsheet and word processing applications). Because of the nature of a service-oriented architecture, client proxies can be issued by different vendors, and a third-party can perform aggregation and customization (e.g., personalization) of the different client proxies according to an end-user's preferences. This application can be comparable to so-called "Employee Self Services," with a distinction being that any individual can be an end-user.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can differ and still achieve desirable results. For example, the operations of the flowchart illustrated in FIG. 2 that include determining if any customizations should be made (220) and determining which customizations to make (240) could be aggregated into a single process of determining which customization to make. In certain implementations, multitasking and parallel processing may be preferable. Other embodiments are within the scope of the following claims

What is claimed is:

1. A method of generating a client proxy, the method comprising:
   receiving one or more customization properties of a client computer at a server computer, the client computer communicating with the server computer over a communication network, the customization properties comprising at least one of client platform properties and user properties, wherein:
      the client platform properties are inaccessible to a vendor at a time of distributing a client proxy generation infrastructure to a service host, the client proxy generation infrastructure operable to generate the client proxy, and
      the client platform properties are provided in an interaction including at least one of a person or a company for whom or for which, respectively, the client proxy is generated;
   determining one or more customizations for the client proxy based on the one or more customization properties of the client computer at the server computer, the client proxy modifying communications received from or sent to the server computer, such that the communications can be understood by the client computer or the server computer;
   generating the client proxy at the server computer by automatically populating technical- and application-level customizing parameters without performance of user customizing activities;
   transmitting the client proxy from the server computer to the client computer for execution of the client proxy on the client computer, the client proxy embodying the one or more customizations;
   receiving a service call at the server computer, the service call being generated by the client proxy; and
   executing, at the server computer, a service provided as an executable application in response to receiving the service call, the client proxy translating a request of a first type to a request of a second type, the first type corresponding to a request format used by the client computer and the second type corresponding to a request format used by the server computer.

2. The method of claim 1, wherein generating the client proxy comprises generating the client proxy as executable code to execute on the client computer.

3. The method of claim 1, wherein generating the client proxy comprises generating the client proxy as source code to be compiled on the client computer.

4. The method of claim 1, wherein the one or more customizations include a customization that defines a modification of a default client proxy.

5. The method of claim 4, wherein the modification defines a setting of a value for the default client proxy.

6. The method of claim 1, wherein the one or more customizations include a customization that defines a combination of designtime objects for the client proxy.

7. The method of claim 1, wherein the one or more customizations are prescribed in a format in accordance with a service description and generating the client proxy comprises generating the client proxy in accordance with the service description.

8. The method of claim 7, wherein the service description is expressed in Web Services Description Language.

9. The method of claim 1, wherein the one or more properties of the client computer comprise one or more security protocols supported by the client computer.

10. The method of claim 1, wherein the client computer executes an operating system and the one or more properties of the client computer comprise properties of the operating system.

11. The method of claim 1, wherein:
   the one or more customizations comprise at least one of a modification of a default client proxy, a combination of designtime objects for the client proxy, a combination of runtime objects for the client proxy, and a combination of a default client proxy, designtime objects, and runtime objects; and
   the one or more customizations tailor the client proxy to at least one of the client computer and a user of the client computer.

12. A machine-readable storage device encoded with a computer program, the computer program comprising instructions that, when executed, causes a data processing apparatus to perform a method comprising:
   receiving one or more customization properties of a client computer at a server computer, the client computer communicating with the server computer over a communication network, the customization properties comprising at least one of client platform properties and user properties, wherein:
- the client platform properties are inaccessible to a vendor at a time of distributing a client proxy generation infrastructure to a service host, the client proxy generation infrastructure operable to generate the client proxy, and
- the client platform properties are provided in an interaction including at least one of a person or a company for whom or for which, respectively, the client proxy is generated;

determining one or more customizations for the client proxy based on the one or more customization properties of the client computer at the server computer, the client proxy modifying communications received from or sent to the server computer, such that the communications can be understood by the client computer or the server computer;

generating the client proxy at the server computer by automatically populating technical- and application-level customizing parameters without performance of user customizing activities;

transmitting the client proxy from the server computer to the client computer for execution of the client proxy on the client computer, the client proxy embodying the one or more customizations;

receiving a service call at the server computer, the service call being generated by the client proxy; and executing, at the server computer, a service provided as an executable application in response to receiving the service call, the client proxy translating a request of a first type to a request of a second type, the first type corresponding to a request format used by the client computer and the second type corresponding to a request format used by the server computer.

13. The machine-readable storage device of claim 12, wherein the one or more customizations include a customization that defines a modification of a default client proxy.

14. The machine-readable storage device of claim 12, wherein the one or more customizations include a customization that defines a combination of designtime objects for the client proxy.

15. The machine-readable storage device of claim 12, wherein a customization is prescribed in a format in accordance with a service description and the generating the client proxy comprises generating the client proxy in accordance with the service description.

16. A system for generating a customized client proxy, the system comprising:
- a client computer; and
- a server computer in communication with the client computer over a communication network, the server computer configured to perform operations comprising:
  - receiving one or more customization properties of the client computer, the customization properties comprising at least one of client platform properties and user properties, wherein:
    - the client platform properties are inaccessible to a vendor at a time of distributing a client proxy generation infrastructure to a service host, the client proxy generation infrastructure operable to generate the client proxy, and
    - the client platform properties are provided in an interaction including at least one of a person or a company for whom or for which, respectively, the client proxy is generated,
  - determining one or more customizations for the client proxy to be executed on the client computer based on the one or more customization properties of the client computer, the client proxy modifying communications received from or sent to the server computer such that the communications can be understood by the client computer or the server computer,
  - generating the client proxy by automatically populating technical- and application-level customizing parameters without performance of user customizing activities,
  - transmitting the client proxy to the client computer for execution of the client proxy on the client computer, the client proxy embodying the one or more customizations,
  - receiving a service call, the service call being generated by the client proxy, and
  - executing a service provided as an executable application in response to receiving the service call, the client proxy translating a request of a first type to a request of a second type, the first type corresponding to a request format used by the client computer and the second type corresponding to a request format used by the server computer.

17. The system of claim 16, wherein the client proxy generation infrastructure generates the client proxy comprising the one or more customizations based on a modification of a default client proxy.

18. The system of claim 16, wherein the client proxy generation infrastructure generates the client proxy comprising the one or more customizations based on a combination of designtime objects for the client proxy.

19. The method of claim 1, wherein the service interacts with deployment data and transaction data, the client proxy being generated based on the deployment data and the transaction data.

20. The method of claim 1, wherein the deployment data includes one or more of a prescription of a message format, a communication protocol, and security and policy standards, and the transaction data includes content that describes transactions performed as part of the service.

* * * * *